United States Patent [19]

Akiyama

[11] Patent Number: 5,031,406

[45] Date of Patent: Jul. 16, 1991

[54] CONTROL SYSTEM FOR BOOST PRESSURE IN INTERNAL COMBUSTION ENGINE WITH TURBOCHARGER

[75] Inventor: Eitetsu Akiyama, Wako, Japan

[73] Assignee: Honda Giken Kogyo Kabushiki Kaisha, Tokyo, Japan

[21] Appl. No.: 365,648

[22] Filed: Jun. 13, 1989

[30] Foreign Application Priority Data

Jun. 16, 1988 [JP] Japan .................. 63-149380

[51] Int. Cl.$^5$ .......................................... F02B 37/00
[52] U.S. Cl. ...................................... 60/602; 123/564
[58] Field of Search ............... 60/600, 601, 602, 603; 123/564

[56] References Cited

U.S. PATENT DOCUMENTS 4,519,210  5/1985  Iwamoto ............................ 60/602
4,617,799  10/1986 Todokoro .......................... 60/602
4,646,522  3/1987  Mamiya .............................. 60/602
4,788,822  12/1988 Mieno .................................. 60/602

Primary Examiner—Douglas Hart
Attorney, Agent, or Firm—Armstrong, Nikaido, Marmelstein, Kubovcik, & Murray

[57] ABSTRACT

A system for controlling a boost pressure in an internal combustion engine is equipped with a turbocharger. Engine operation is divided into three regions based on an engine speed with respect to an engine load. Throughout the regions, a target boost pressure is predetermined to be considerably lower than a level at which knock frequently occurs. In the region where the engine speed and load are relatively high, the target boost pressure is gradually raised until knock occurs. When knock occurs, the target boost pressure is fixed at a value slightly lower than the value at which knock has occurred and thereafter the boost pressure is controlled to the fixed target pressure.

7 Claims, 6 Drawing Sheets

CONTROL SYSTEM FOR BOOST PRESSURE IN INTERNAL COMBUSTION ENGINE WITH TURBOCHARGER

BACKGROUND OF THE INVENTION

1. Field of the Invention

This invention relates to a control system for controlling the boost pressure in an internal combustion engine equipped with a turbocharger and more particularly to such a system wherein the boost pressure is variably controlled with reference to presence or absence of knock.

2. Description of the Prior Art

Techniques usable in turbocharger-equipped internal combustion engines for variably controlling the boost pressure in a manner that is responsive to an occurrence of a knock are well known. One example is that disclosed in Laid-Open Japanese Publication No. 60(1985)-56128. The technique disclosed in this application involves deriving, from the engine speed and load, a basic target value to which the boost pressure is to be controlled, adjusting the basic value to a lower level when knock is detected, and raising the basic value again after knock ceases so as to increase the power output of the engine.

One problem with this system is that knock tends to occur frequently because the target value for the boost pressure is set relatively high in the vicinity of the knock limit, where knock frequently occurs. Another problem is, as a result, that the drivability of the vehicle equipped with the engine is degraded because "hunting" occurs in the power output due to the fact that the boost pressure is lowered and raised every time knock occurs. These problems become particularly pronounced when the engine is supplied with a fuel of a different octane number from that which it was designed to use.

SUMMARY OF THE INVENTION

In consideration of the foregoing shortcomings of the prior art, one object of this invention is to provide a control system for a boost pressure in an internal combustion engine equipped with a turbocharger which reduces the occurrence frequency of knock and the frequency of variation in the boost pressure and thus improves the drivability of the vehicle in which the engine is used.

Another object of this invention is to provide such a system wherein the boost pressure control is optimally carried out throughout the entire range of the engine operating conditions.

Still another object of this invention is to provide such a system wherein the target value of the boost pressure is preset with reference to a fuel with a low octane number and can be reset to a value matched to the fuel actually supplied to the engine if a fuel with a higher octane number is used.

For realizing these objects, the present invention provides a system for controlling a boost pressure in an internal combustion engine equipped with a turbocharger, comprising a first device for detecting an engine speed of the engine to generate an output signal in response thereto, a second device for detecting a load state of the engine to generate an output signal in response thereto and a third device for detecting occurrence of knock to generate an output signal in response thereto. A control device is provided for determining, upon receipt of the output signals of the first, second and third device, a target boost pressure based upon at least the detected engine speed. The control device determines the target boost pressure at a level considerably lower than the level at which knock frequently occurs and gradually raises the target boost pressure until knock occurs. An output signal is sent to an actuator device for varying the boost pressure.

DETAILED DESCRIPTION OF THE PREFERRED EMBODIMENTS

Embodiments of the invention will now be described with reference to the attached drawings.

Figure 1:
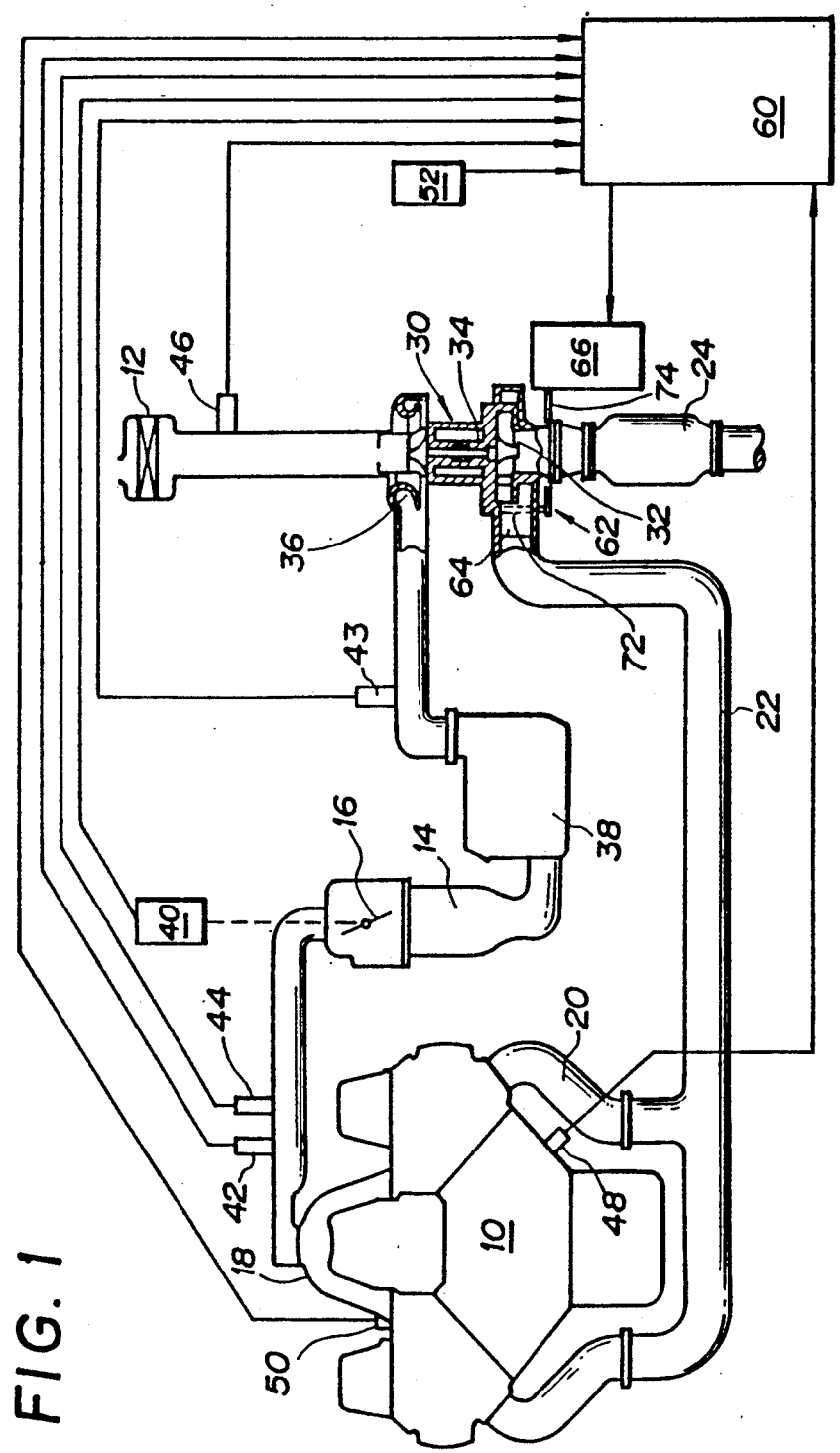
FIG. 1 is an overall schematic view of the control system according to this invention.

FIG. 1 is a schematic diagram showing the overall arrangement of the control system for controlling the boost pressure in a multi-cylindered internal combustion engine equipped with a turbocharger according to this invention, in which the reference numeral 10 designates a main engine unit. Air drawn in through an air cleaner 12 flows through an air intake passage 14 into an intake manifold 18 and then into combustion chambers (not shown) of the main engine unit 10. The flow rate of the intake air through the air intake passage 14 is controlled by a throttle valve 16. The intake air is supplied with fuel through a fuel injection valve (not shown) provided in the vicinity of each combustion chamber and the resulting fuel-air mixture is introduced into the combustion chambers and ignited. The exhaust gas resulting from the combustion of the fuel-air mixture passes through an exhaust manifold 20 to an exhaust passage 22, and then through a catalytic converter 24 to the exterior.

The main engine unit 10 is further equipped with a turbocharger 30 having a turbine 32 disposed in the exhaust passage 22 and driven by exhaust gas. The motive power received by the turbine 32 is transmitted through a water-cooled shaft 34 to a compressor 36 disposed in the air intake passage 14. The compressor 36 compresses the intake air and pumps it to the combustion chambers. An intercooler 38 of, for example, the water cooled type is provided in the air intake passage 14 downstream of the compressor 36 for cooling the compressed intake air.

In the vicinity of the throttle valve 16 of the air intake passage 14 there is provided a throttle position sensor 40 comprising a potentiometer or the like for detecting the degree of opening of the throttle valve. Downstream of the throttle position sensor 40 are further provided an intake air pressure sensor 42 for detecting the absolute pressure of the intake air at the point where this sensor is disposed, a boost pressure sensor 43 which detects the boost pressure supplied by the compressor 36, and an intake air temperature sensor 44 which detects the temperature of the intake air. In addition, an atmospheric pressure sensor 46 for detecting atmospheric pressure is provided in the air intake passage 14 at a point near the air cleaner 12. There are also provided a coolant temperature sensor 48 which is disposed at an appropriate position in a coolant passage (not shown) of the main engine unit 10 for detecting the temperature of the coolant, a knock sensor 50 consisting of a piezoelectric element or the like disposed in the vicinity of a combustion chamber for detecting the combustion condition, and a crankshaft sensor 52 disposed at an appropriate position in the vicinity of a rotating member such as the distributor (not shown), which detects the crank angle and outputs a signal once per a predetermined degree of change therein. The outputs of the sensors 40, 42, 43, 44, 46, 48, 50 and 52 are sent to a control unit 60 as inputs thereof.

Figure 2:
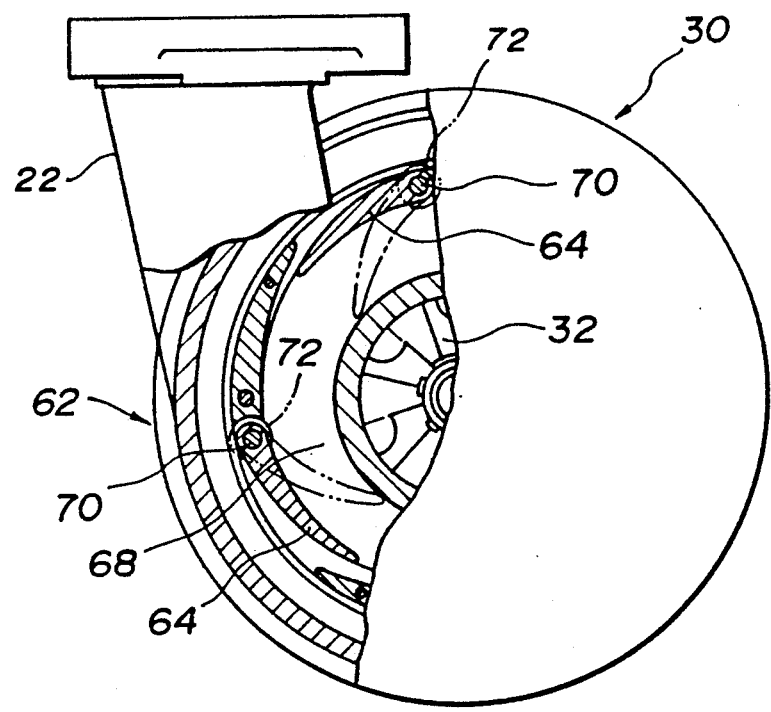
FIG. 2 is a side view, partially in section, of variable vanes of a boost pressure adjuster of FIG. 1.

The turbocharger 30 is further provided with a boost pressure adjuster 62 which comprises variable vanes 64 and an actuator 66 for adjusting the angle of the vanes 64. The vanes are shown in more detail in FIG. 2. Specifically, a plurality of variable vanes 64 are provided on a scroll 68 situated between the exhaust passage 22 and the turbine 32. As indicated in phantom lines in FIG. 2, each variable vane 64 can be pivoted about a shaft 70 so that its tip end moves inwardly toward the center of the turbine, thus throttling the flow rate at the scroll, increasing the rotating speed of the turbine 32, and increasing the boost pressure. The shafts 70 are loosely fitted within a sleeve 72 formed integrally with the variable vanes 64 and the sleeve 72 is linked with the actuator 66 via a rod 74 (FIG. 1). The actuator 66 comprises a diaphragm (not shown) and the rod 74 is connected therewith. One side of the diaphragm receives the negative pressure introduced from the air intake passage via a bypass (not shown) branched therefrom downstream of the throttle valve 16, and the other side thereof receives atmospheric pressure. An solenoid valve is provided for closing the by-pass through an appropriate means (neither shown). The solenoid valve is connected with the control unit 60 and is driven by a pulse train of an appropriate duty ratio sent from the unit 60 via a drive circuit, so as to fully or partially close the by-pass. The angle of the variable vanes 64 is thus adjusted as desired.

Figure 3:
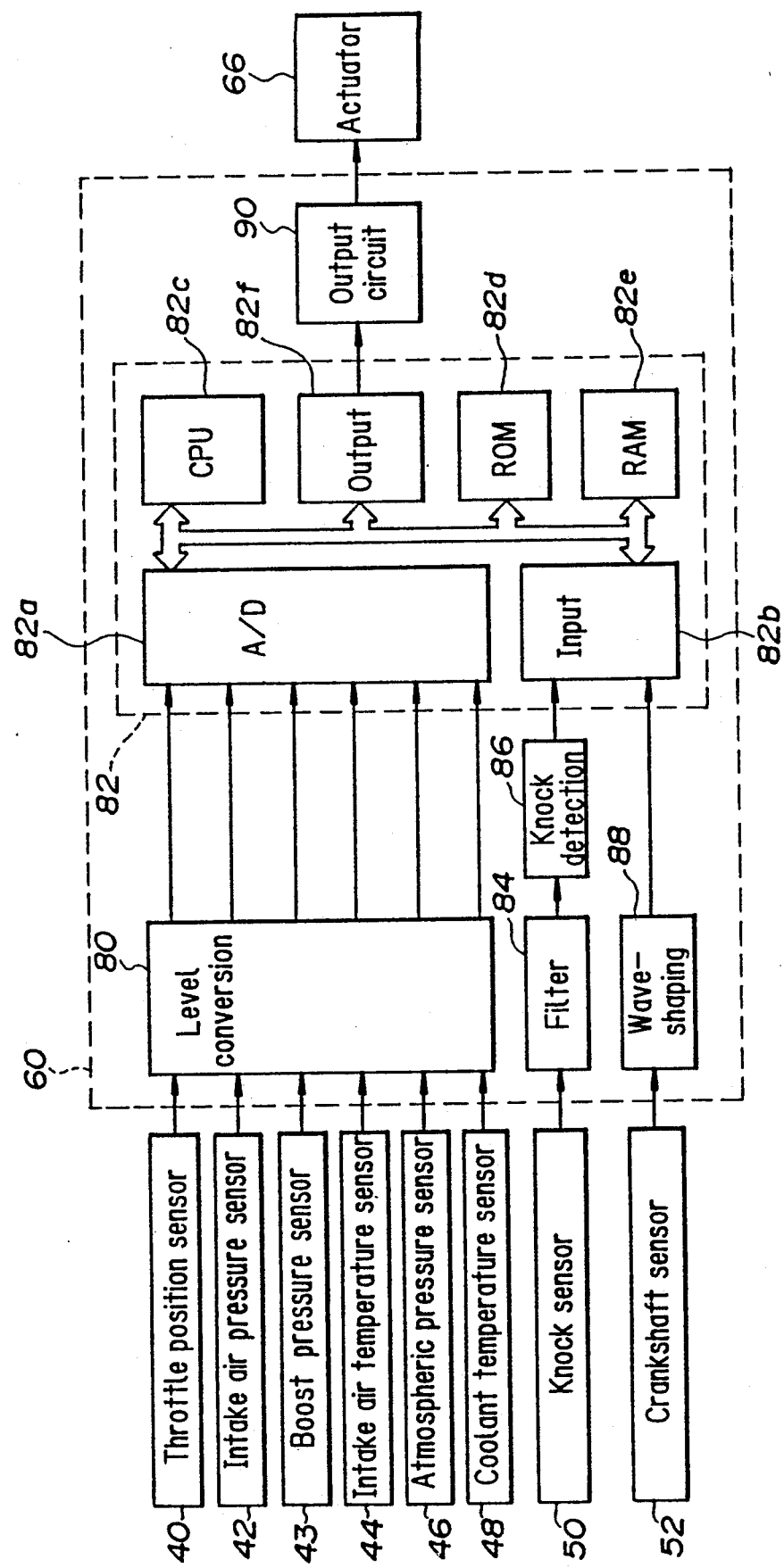
FIG. 3 is a block diagram of a control unit used in the control system.

The control unit 60 is shown in greater detail in the block diagram of FIG. 3. As shown in the figure, the outputs of the throttle position sensor 40, the intake air pressure sensor 42 and the like are first adjusted to an appropriate level in the unit by a level conversion circuit 80 and then input to a microcomputer 82. The microcomputer 82 has an A/D converter 82a, an input interface 82b, a CPU (central processing unit) 82c, a ROM (read-only memory) 82d, a RAM (random access memory) 82e and an output interface 82f. It also has a counter and a timer (neither shown) for use in processing operations. The outputs of the level conversion circuit 80 are sent to the microcomputer 82 where they are converted into digital signals by the A/D converter 82a and then temporarily stored in the RAM 82e. Upon entering the control unit 60, the output of the knock sensor 50 is applied to a filter 84 which passes only the knock frequency component thereof and then to a knock detection circuit 86 in which it is compared with a prescribed value for discrimination of occurrence of knock. The output of the circuit is sent to the microcomputer 82 through the input interface 82b. The output of the crankshaft sensor 52 is first shaped into a waveform in a waveforming circuit 88 and then input to the microcomputer 82 through the input interface 82b. The microcomputer 82 computes a boost pressure control value in the terms of the aforesaid duty pulse ratio for the solenoid value in a manner to be explained later and outputs the computed value to actuator 66 (i.e. the solenoid valve) via an output circuit 90 so as to vary the angle of the variable vanes 64 and increase/decrease the boost pressure.

The operation of the above-described control system will now be explained with reference to FIG. 4. The program illustrated in this figure is interrupted and restarted at prescribed time intervals or prescribed crankangle intervals.

First, in the step S10, the outputs of the sensors are read. These outputs are the throttle valve opening $\theta$TH, the boost pressure P2N, the intake air temperature TA, the atmospheric pressure PA, the coolant temperature TW, the knock signal KN and the engine speed Ne.

The procedure then advances to step S11 in which it is determined whether or not conditions prohibiting boost pressure control are present. More specifically, boost pressure control is discontinued under certain prescribed conditions such as when the engine is being started, when the coolant temperature is below 20° C. or above 100° C. or when the boost pressure is extremely high.

Next, in step S12, using the engine speed Ne and the throttle valve opening $\theta$TH as address data, there is retrieved from the ROM 82d a map value stored therein and indicating the basic value of the pulse duty ratio DM which should be output to the actuator 66. It should be noted that the basic pulse duty ratio, which defines the magnitude of the target boost pressure, is predetermined such that the target boost pressure will be considerably lower than the level at which knock frequently occurs, i.e. considerably lower than the aforesaid knocking limit. The procedure then moves to step S14 in which it is determined whether or not the throttle valve opening $\theta$TH is greater than a prescribed value $\theta$THFB and, if it is not, open loop control is initiated by advancing to step S16 in which an atmospheric pressure correction coefficient KPA stored in the ROM 82d as a table value is retrieved using the detected atmospheric pressure PA as address data, to step S18 in which an output duty value DOUT compensated for the present atmospheric pressure is obtained by multiplying the basic duty value DM by the coefficient KPA, to step S20 in which a flag FOPEN is turned on for indicating that open loop control is in progress, and then to step S22 in which a pulse train of the calculated duty ratio is output to the actuator 66 through the output circuit 90. The reason for conducting atmospheric pressure compensation in step S18 is to correct for the change in charging efficiency that would otherwise occur a change in atmospheric pressure. In this open loop control, the scroll is moved in the opening/closing direction in accordance with the basic duty value so as to set the boost pressure. As factors such as the flow rate of the intake air cause the boost pressure to vary, the boost pressure is thus regulated to an appropriate prescribed value by varying the degree of opening of the scroll according to the aforesaid engine speed and other operating conditions.

In step S14, when it is found that the throttle valve opening is greater than the prescribe value, namely that the load on the engine is greater than a prescribed level, the procedure moves to step S23 in which the flag FOPEN is turned off, whereafter closed loop control is initiated by moving to step S24 in which the coefficient corresponding to the atmospheric pressure PA is retrieved, to step S26 in which a target boost pressure P2REF (hereinafter referred to as the "second" target boost pressure) is retrieved from a map in the ROM 82d using the engine speed Ne and the intake air pressure TA as address data, and to step S28 in which a correction coefficient KREFTB is computed. The second target boost pressure is different from the aforesaid first target boost pressure determined in the terms of the pulse duty ratio and should not be confused therewith. The relation between the two target boost pressures will be explained later with reference to steps S30 and thereafter in FIG. 4. Similar to the first target pressure, the second target pressure P2REF is predetermined to be lower than the aforesaid knocking level.

Figure 5:
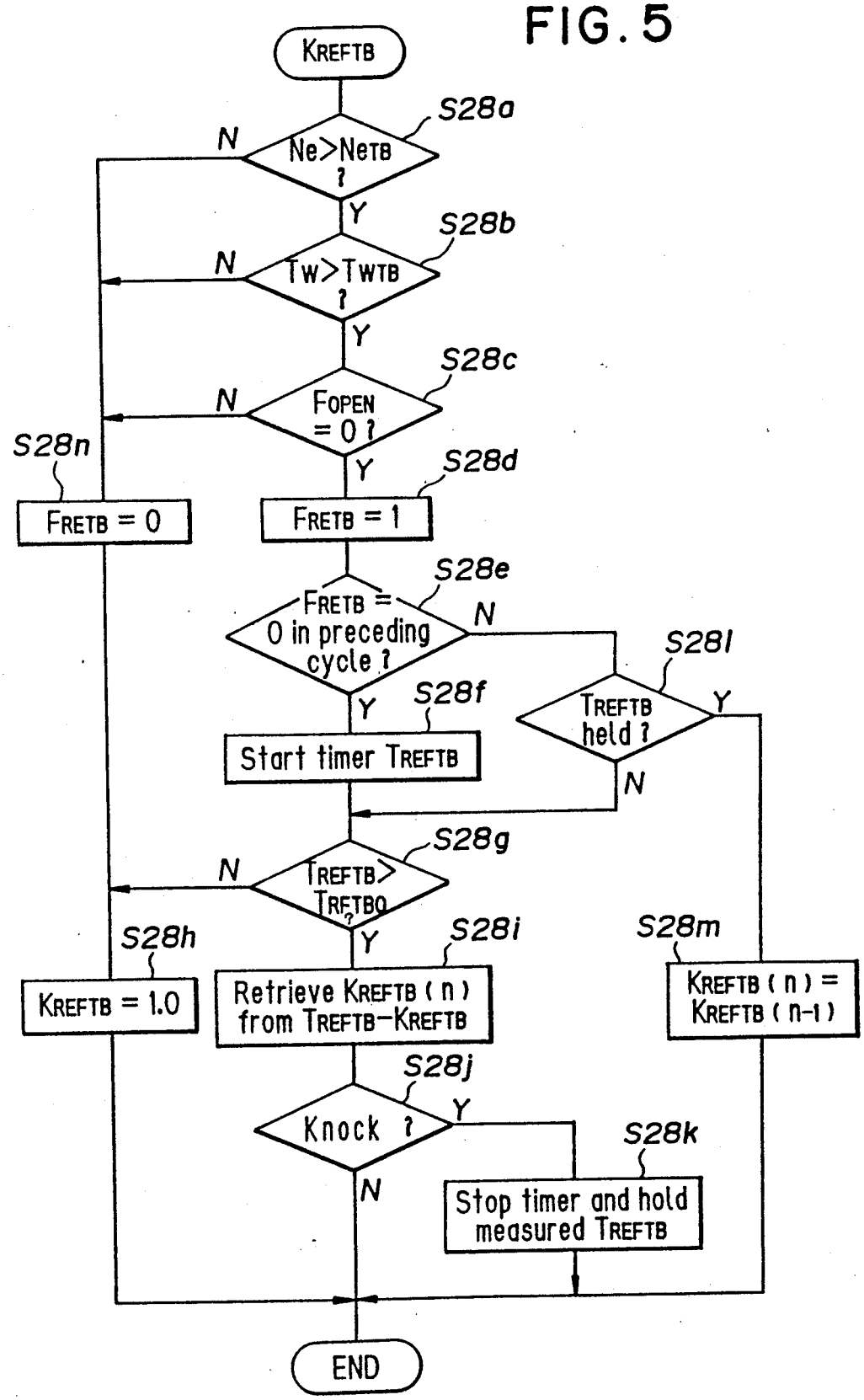
FIG. 5 is a flowchart showing a subroutine of the flowchart of FIG. 5.

FIG. 5 is flowchart of a subroutine for computing the correction coefficient KREFTB. The procedure of this subroutine starts with step S28a in which it is determined whether or not the engine speed Ne exceeds a predetermined value NeTB. Before going into an explanation of the remaining steps of this subroutine, however, it will be helpful to give an overall explanation of the control used in this invention with reference to FIG. 6, which illustrates the entire engine operating range defined by the engine speed with respect to the engine load, where the area is divided into three regions.

Figure 4:
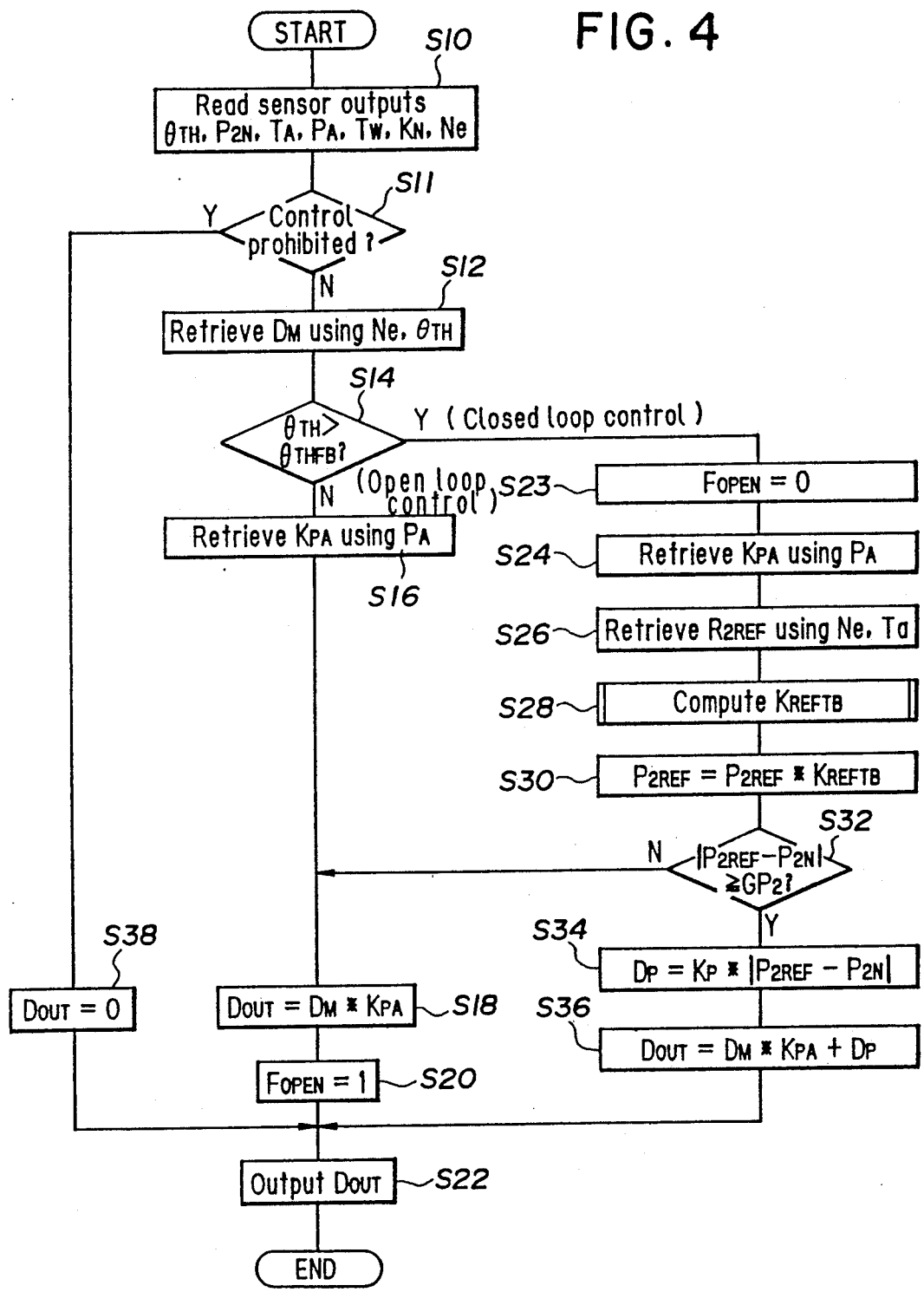
FIG. 4 is a flowchart showing the operation of the control system.

To begin with, it is determined whether closed loop control should be employed by determining whether or not the throttle valve opening $\theta$TH exceeds the prescribed value $\theta$THFB (in S14 of the flowchart of FIG. 4). When the throttle valve opening $\theta$TH does not exceed the prescribed value $\theta$THFB, this means that the engine is under a low load and that relatively coarse control will be adequate. Open loop control is therefore used. This is referred to as region A in the figure. In this region, the boost pressure can, as explained in the foregoing, be generally maintained at the desired relatively low value by the basic duty value appropriately varied in response to the operating condition, though a high degree of accuracy cannot be assured since no feedback is conducted. On the other hand, when the throttle valve opening $\theta$TH exceeds the prescribed value $\theta$THFB, optimum closed-loop control matched to the operating condition is carried out. In the control according to the present invention, when this condition arises, one or the other of two control regions, a control region B or a control region C, is selected depending on whether the engine speed Ne exceeds the prescribed value NeTB (in step S28a of the flowchart of FIG. 5).

Figure 6:
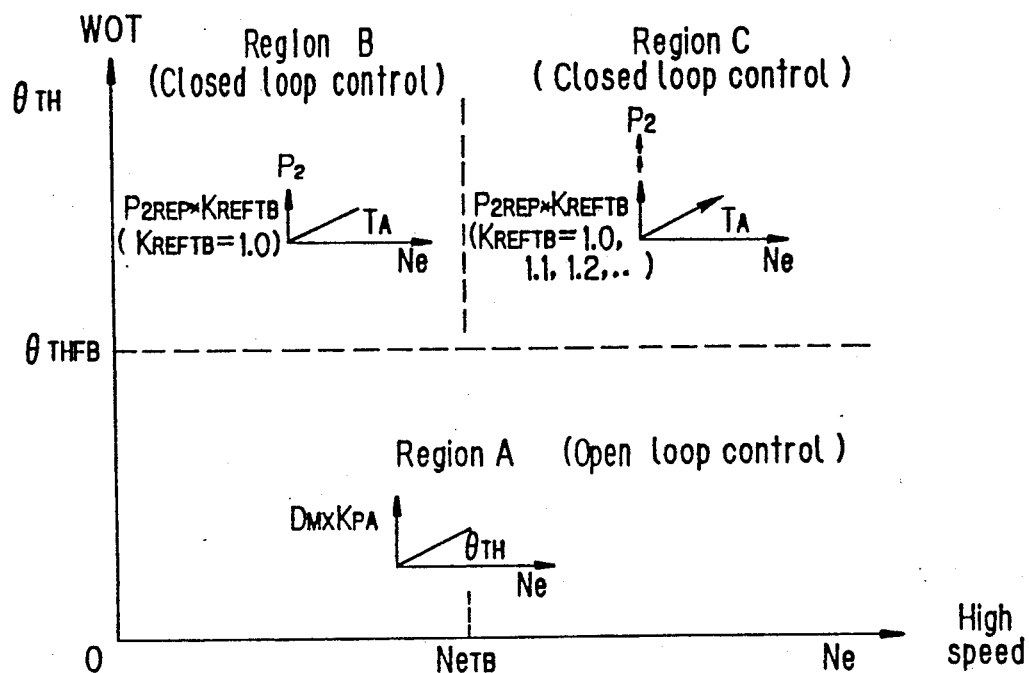
FIG. 6 is a graph showing the entire engine operating range defined by the engine speed with respect to the engine load for explaining the operation of the control system.

To be more specific, when the throttle valve opening exceeds the prescribed value, the boost pressure is controlled to the second target value by feedback control. In this case, however, the second target boost pressure is maintained unchanged in the region in which the engine speed is not higher than the prescribed engine speed NeTB (the region B), meaning that the correction coefficient KREFTB is maintained at 1.0, so that the target boost pressure continues to remain at the relatively low level. On the other hand, in the high engine speed region above the prescribed engine speed NeTB (the region C), the value of the correction coefficient KREFTB by which the target boost pressure P2REF is multiplied is gradually increased with respect to time, as shown in FIG. 6, from 1.0 to 1.1, 1.2 . . . so as to increase the target boost pressure, this increase of the correction coefficient KREFTB is discontinued once knocking has been detected. What this means is that, since it is desired to enhance the engine output in region C, this target boost pressure is gradually increased until knocking occurs, whereafter it is fixed at the value immediately preceding the occurrence of knocking. In view of this, the prescribed engine speed NeTB serving to separate the region C from the region B is appropriately set with consideration as to whether it is adequate for defining the region in which the engine output is required to be increased by increasing the boost pressure.

Returning to the flowchart of FIG. 5, as explained earlier it is determined in step S28a whether or not the engine speed Ne exceeds the prescribed engine speed NeTP. If it is found to exceed this value, the procedure moves to step S28b in which it is determined whether or not the coolant temperature TW exceeds a prescribed value TWTB, which is appropriately set with consideration to the point at which the coolant temperature begins to necessitate an increase in the boost pressure. If the result of the determination in step S28b is YES, the procedure advances to step S28c in which it is confirmed that the open loop control flag is off, to step S28d in which a flag FREFTB is turned on, to step S28e in which it is determined whether or not this is the first program cycle at which this flag has been turned on, and if it is, to step S28f in which a timer for measuring a time TREFTB is started for measurement of lapsed time. The reason for starting the timer TREFTB will be understood from FIG. 7. As can be seen in this figure, the correction coefficient KREFTB is gradually increased from the point at which a prescribed time period TREFTBO has lapsed after the region C was entered. The timer TREFTB is therefore started upon entry into region C so as to determine this point of time. The reason for establishing this time delay is to prevent occurrence of hunting in the engine output.

After the measurement of time lapse has begun in step S28f, the procedure moves to step S28g in which it is determined whether or not the prescribed time period TREFTBO has lapsed. If this is the first cycle of the program in which the timer has been started, the result of the determination in step S28g will be NO and the procedure moves to step S28h in which the correction coefficient KREFTB is set to 1.0. In this case, therefore, the second target boost pressure is not changed, insofar as an engine speed or an intake air temperature is not changed, as was referred in S26 in FIG. 4.

Figure 7:
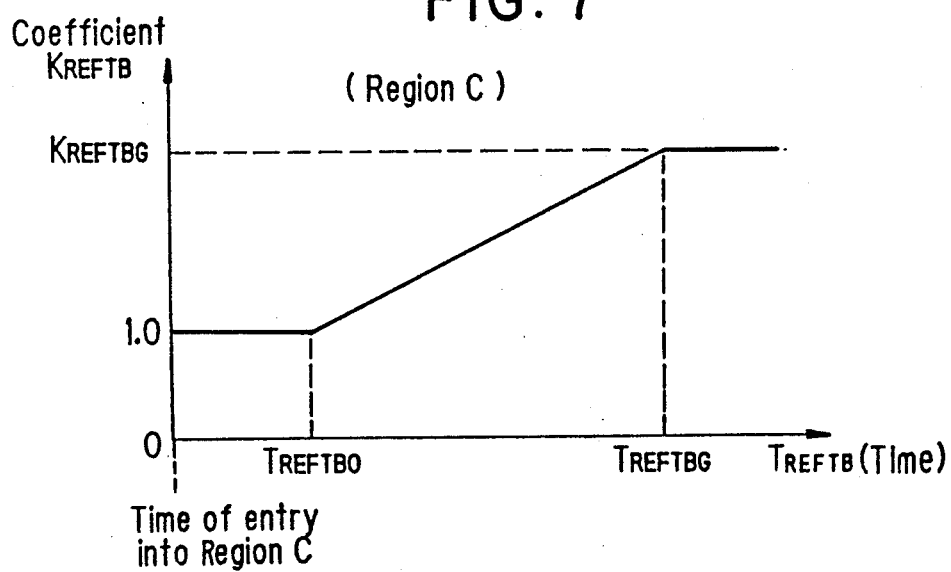
FIG. 7 is a graph for explaining characteristics of a coefficient of a target boost pressure defined with respect to time.

After the program has repeated a number of cycles and it is found in step S28g that the time TREFTBO has lapsed, the procedure moves to step S28i in which the value of the correction coefficient KREFTB corresponding to the lapsed time is retrieved from a TREFTB-KREFTB table stored in the ROM 82d and designated as KREFTB(n). FIG. 7 shows the table in a graphic form. As the second target boost pressure P2REF is multiplied by this coefficient in the two regions and particularly in the region C the target boost pressure increases with lapsed time, as shown in FIG. 6, and the actual boost pressure also increases accordingly. It should be noted here that, the value increased is the coefficient, and not the second target pressure itself, so that the actual pressure will increase if P2REF is unchanged or changed in the higher direction. However, if an engine speed, for instance, varies and the P2REF is changed to be lower one, the actual boost pressure might decrease accordingly. Any way, with the arrangement, the boost pressure can be increased until knock occurs while taking into consideration of changes in engine operating conditions other than knock.

The procedure then advances to step S28j in which it is determined from the output KN of the knock detection circuit 86, whether or not knock has occurred. When knock is detected, the procedure moves to step S28k in which the timer is stopped, causing the measured value TREFTB to be held or fixed. Therefore, in the following program cycle, the result of the determination in step S28e will be NO so that the procedure will advance to step S28l in which it will be found that the measured time is being held. In this case, the procedure then moves to step S28m in which the most recent value of the correction coefficient KREFTB, namely KREFTB(n) (more precisely, the value at the beginning of the preceding program cycle is replaced by the immediately preceding value KREFTB(n−1) (more precisely, the value at the beginning of two cycle earlier where no knock occurred). The procedure then returns to the main routine of FIG. 4. Thus, in succeeding cycles of the main routine, insofar as the procedure skips to the subroutine of FIG. 5 at step S28, the correction coefficient will be fixed at the KREFTB(n−1) or KREFTB= 1.0 determined in the subroutine. Here it should be noted that when knock is not detected in step S28j, the result of the determination in S28l in the following cycle will be NO, whereby the value of the correction coefficient KREFTB will continue to be increased with lapsed time measured by the timer TREFTB. In this case, however, the value of the correction coefficient reaches an upper limit of KREFTBG when the measured lapsed time reaches its upper limit of TREFTBG. The upper limit KREFTBG is appropriately set such that the boost pressure can reach +400 mmHg or a maximum of +500 mmHg when a fuel with a high octane number is used. While use of a fuel with an ordinary octane number can be expected to result in knock as the boost pressure continues to rise after passing above +400 mmHg, in this case, as was explained in the foregoing, the boost pressure is held so as to prevent recurrence of knocking. When the result of the determination in any of the first three steps S28a, 28b, 28c is NO, the procedure passes first to step S28n in which the flag REFTB is turned off and the procedure thereafter returns to the flowchart of FIG. 4 with the value of the correction coefficient KREFTB still remaining at 1.0. Further, though not shown in the drawings, the correction coefficient KREFTB either is reset when the engine is stopped or is cleared at the time of initialization when the engine is restarted after once being stopped. This is done in anticipation that fuel of a different octane number may be supplied to the vehicle during the time that the engine is stopped.

Returning to the flowchart of FIG. 4, in the succeeding step S32 the deviation (absolute value) between the second target boost pressure P2REF and the actual boost pressure P2N (sensor output) is found and it is determined whether or not this deviation exceeds an appropriately set permissible value GP2 of, say, 10 mmHg. If the deviation is found to be not higher than the permissible value, the procedure moves to step S18 in which open loop control is resumed. In other words, it is presumed that closed loop control is not required if the deviation between the second target and actual boost pressures is within the permissible range.

Figure 8:
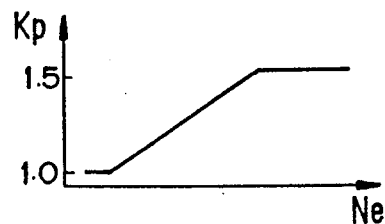
FIG. 8 is a graph for explaining characteristics of another correction coefficient used in the control system.

On the other hand if it is found in step S32 that the deviation is greater than the permissible value, the procedure moves to step S34 in which a corrected duty value DP for closed loop control is computed by multiplying the deviation by a proportional correction constant KP. The correction constant KP can be a fixed value or can be changed with relation to the operating condition. FIG. 8 shows a case in which it is changed in accordance with the operating condition, namely, is made larger or smaller depending on the engine speed. These table values are stored in the aforesaid ROM 82d.

The procedure then moves to step S36 in which the correction duty value is added to the basic duty value (corresponding to the aforesaid first target boost pressure) and the sum is output. In this way, the basic value is corrected proportionally to the deviation between the second target pressure and actual pressure, with the result that the actual boost pressure is controlled to converge on the second target boost pressure. In the flowchart of FIG. 4, when it is found in step S11 at the beginning of the procedure that conditions prohibiting boost pressure control are present, the output is made zero and the program discontinued (step S38).

In the aforesaid embodiment, in the region of increasing boost pressure defined in terms of the throttle valve opening and the engine speed (i.e. the region C), the target boost pressure predetermined at a relatively low level is gradually corrected in the increasing direction until knock occurs, whereafter it is then fixed at the value immediately preceding the value at which knock occurred. As a result, recurrence of knock can be prevented, whereby the drivability can be improved without frequently increasing and decreasing the boost pressure and the engine can be protected. Therefore, even in a case where the knock limit falls to a lower level because of the use of a fuel with a different octane number (an octane number lower than that set initially), the fact that the control of the boost pressure is started from a low value and gradually increased makes it possible to greatly reduce the occurrence of knock and to improve drivability while simultaneously protecting the engine.

What is claimed is:

1. A system for controlling a boost pressure in an internal combustion engine equipped with a turbocharger, comprising:
   first means for detecting a speed of the engine to generate an output signal in response thereto;
   second means for detecting a load state of the engine to generate an output signal in response thereto;
   third means for detecting occurrence of knock to generate an output signal in response thereto;
   fourth means for detecting a boost pressure pumped to the engine to generate an output signal in response thereto;
   control means for determining, upon receipt of the output signals of the first, second and third means, a target boost pressure based upon at least detected engine speed, the control means determining the target boost pressure at a level considerably lower than a level at which knock frequently occurs, the control means comparing detected engine load with a reference load, and, only when the detected engine load is found to exceed the reference load, gradually raising the target boost pressure until knock occurs and regulating, upon receipt of the output of the fourth means, the boost pressure so as to decrease a deviation between determined target boost pressure and detected boost pressure; and actuator means for varying the boost pressure in response to an output signal sent from the control means.

2. A system according to claim 1, wherein said control means compares the detected engine speed with a reference speed and when the detected engine speed is found to exceed the reference speed, gradually raises the target boost pressure with respect to time until knock occurs.

3. A system according claim 2, wherein said control means varies the target boost pressure using a coefficient and gradually increase the coefficient with respect to time until knock occurs.

4. A system according to claim 3, wherein said control means fixes the coefficient at a level lower than that at which knock occurred and thereafter regulates the boost pressure based upon the fixed coefficient.

5. A system according to claim 3, wherein said control means gradually raises the coefficient until a predetermined time has lapsed after the detected engine speed is found to exceed the reference speed.

6. A system according to claim 5, wherein said control means gradually raises the coefficient until it reaches a predetermined value.

7. A system according to any one of the preceding claims, further including:

fifth means for detecting an atmospheric pressure of the air drawn into the engine to generate an output signal in response thereto;

wherein said control means, upon receipt of the output signal of the fifth means, adjusts the target boost pressure relative to the detected atmospheric pressure.

* * * * *